United States Patent
Gatmir-Motahari et al.

(10) Patent No.: US 9,167,454 B1
(45) Date of Patent: Oct. 20, 2015

(54) WIRELESS COMMUNICATION SYSTEM TO DETECT AN ABNORMAL CONDITION ASSOCIATED WITH WIRELESS COMMUNICATION DEVICE TYPES

(71) Applicant: Sprint Communications Company L.P., Overland Park, KS (US)

(72) Inventors: Sara Gatmir-Motahari, Redwood City, CA (US); Heesook Choi, Castro Valley, CA (US); Kosol Jintaseranee, Millbrae, CA (US); Mark J. Bonn, Granite Bay, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/273,317

(22) Filed: May 8, 2014

(51) Int. Cl.
*H04W 52/02* (2009.01)
*H04W 24/04* (2009.01)
*H04W 60/00* (2009.01)

(52) U.S. Cl.
CPC ............ *H04W 24/04* (2013.01); *H04W 60/005* (2013.01)

(58) Field of Classification Search
CPC .......................... H04W 25/0203; H04W 24/08
USPC ............. 455/405, 412.2, 414.1, 452.1, 452.2, 455/67.11, 67.13, 132–135; 370/328, 329, 370/331, 332
See application file for complete search history.

(56) References Cited

U.S. PATENT DOCUMENTS

| | | | |
|---|---|---|---|
| 2013/0090115 A1 | 4/2013 | Deivasigamani et al. | |
| 2013/0182643 A1* | 7/2013 | Pazos et al. | 370/328 |
| 2013/0286918 A1* | 10/2013 | Park et al. | 370/311 |
| 2014/0133293 A1* | 5/2014 | Ismail et al. | 370/229 |

FOREIGN PATENT DOCUMENTS

WO 2005027556 A1 3/2005

* cited by examiner

*Primary Examiner* — Cong Tran (57) ABSTRACT

A wireless communication system has wireless base stations that serve wireless communication devices located in a plurality of wireless communication sectors. The wireless communication devices have wireless device types. The wireless base stations generate performance data that characterizes the performance of the wireless device types in the wireless communication sectors. A data processing system processes the performance data to associate an abnormal condition with one of the wireless device types in one of the wireless communication sectors. The data processing system generates notice data for the one or more wireless device types associated with an abnormal condition. The wireless base stations broadcast the notice data in a Long Term Evolution (LTE) System Information Block (SIB). The notice data identifies the wireless device type. The wireless communication devices decode the LTE SIB to identify the notice data and the wireless device type. If the wireless communication device comprises the wireless device type identified in the notice data, the wireless communication device configures the wireless communication device based on the notice data.

20 Claims, 7 Drawing Sheets

WIRELESS COMMUNICATION SYSTEM TO DETECT AN ABNORMAL CONDITION ASSOCIATED WITH WIRELESS COMMUNICATION DEVICE TYPES

TECHNICAL BACKGROUND

Wireless communication devices communicate with wireless communication networks using wireless protocols, such as Long Term Evolution (LTE), Evolution Data Optimized (EVDO), Code Division Multiple Access (CDMA), Global System for Mobile communications (GSM), High Speed Packet Access (HSPA), and the like. Wireless communication systems, such as cellular voice and data networks, typically include multiple wireless access nodes spread over a geographic area through which wireless communication devices can register and receive wireless access to wireless communication services. In many examples, the wireless communication devices are mobile, and can move between wireless coverage areas, such as sectors, of the wireless access nodes.

Wireless communication devices have different device types. For example, wireless communication devices may be categorized by network type—such as LTE or non-LTE. Wireless communication device may also be categorized by manufacturer (Apple, Samsung, HTC, Nokia, etc.) and/or model (iPhone 4, iPhone 4s, iPhone 5, etc.). Alternatively, wireless communication devices may be categorized by operating system (Apple, Android, or Windows) and/or software version.

Signal strength, network load, and/or other factors may affect the quality of wireless communication service within and across wireless communication sectors. In addition, wireless communication devices of different device types may perform differently across the wireless communication sectors. Wireless communication service may be improved by turning off or disabling certain features on certain device types in certain wireless communication sectors.

OVERVIEW

A wireless communication system has wireless base stations that serve wireless communication devices located in a plurality of wireless communication sectors. The wireless communication devices have wireless device types. The wireless base stations generate performance data that characterizes the performance of the wireless device types in the wireless communication sectors. A data processing system processes the performance data to associate an abnormal condition with one of the wireless device types in one of the wireless communication sectors. The data processing system generates notice data for the one or more wireless device types associated with an abnormal condition. The wireless base stations broadcast the notice data in a Long Term Evolution (LTE) System Information Block (SIB). The notice data identifies the wireless device type. The wireless communication devices decode the LTE SIB to identify the notice data and the wireless device type. If the wireless communication device comprises the wireless device type identified in the notice data, the wireless communication device configures the wireless communication device based on the notice data.

DETAILED DESCRIPTION

Figure 1:
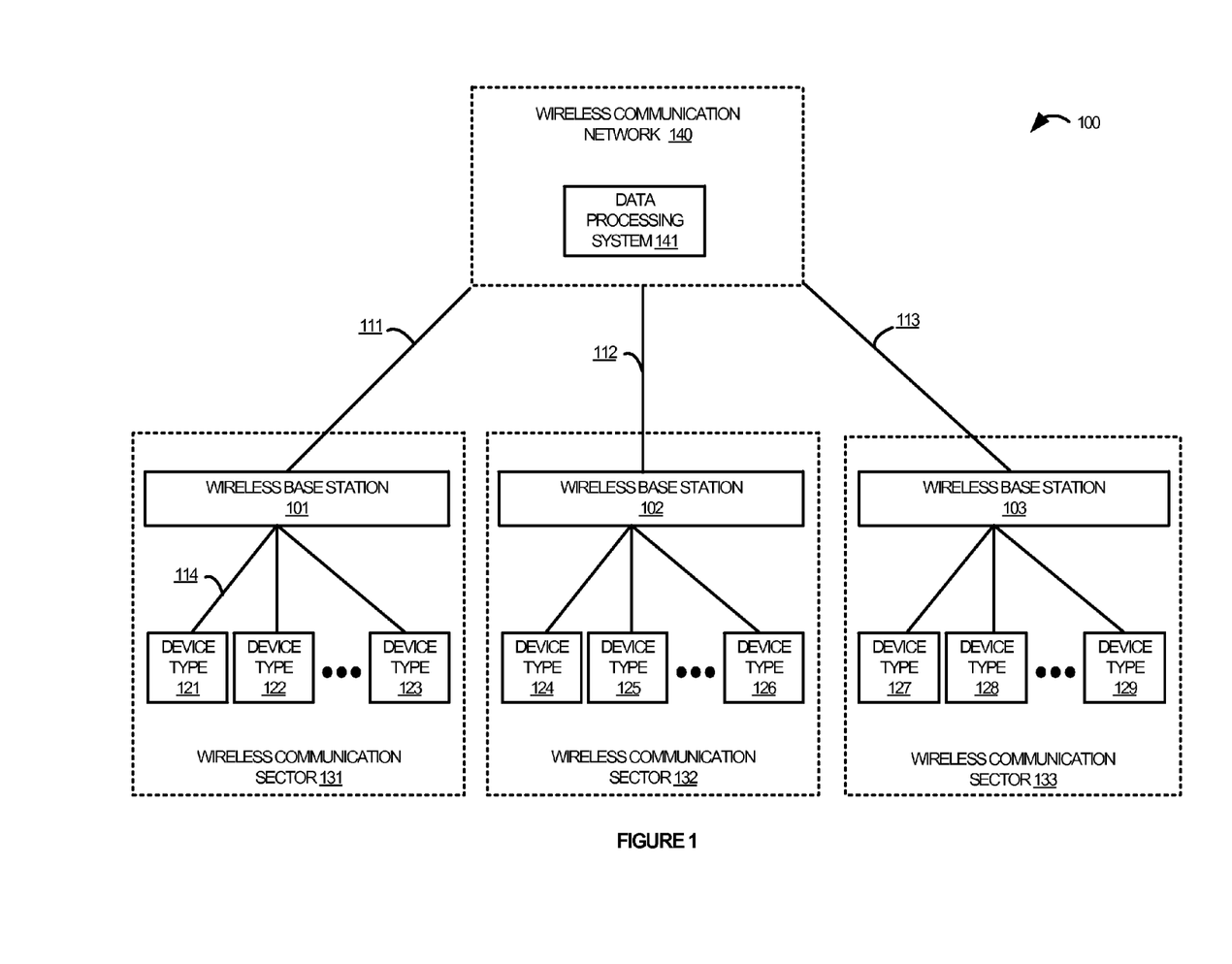
FIG. 1 illustrates a wireless communication system to detect an abnormal condition associated with wireless communication device types.

FIG. 1 illustrates wireless communication system 100 to detect an abnormal condition associated with wireless communication device types. Wireless communication system 100 includes wireless base stations 101-103, wireless communication devices (with device types) 121-129, wireless communication sectors 131-133, wireless communication network 140 that includes data processing system 141, wireless communication link 114, and communication links 111-113. Wireless base station 101 and wireless communication device 121 communication over wireless communication link 114. The other wireless communication links are not numbered for clarity. Only one wireless communication network is shown for clarity, typically there may be more wireless communication networks that operate in a similar manner.

Wireless base station 101 serves wireless communication devices 121-123 in wireless communication sector 131. Wireless base station 102 serves wireless communication devices 124-126 in wireless communication sector 132. Wireless base station 103 serves wireless communication devices 127-129 in wireless communication sector 133. Although, not shown as overlapping, in some examples wireless communication sectors 131-133 may overlap in some areas. Wireless communication network 140 and base stations 101-103 communicate over communication links 111-113, respectively.

Examples of wireless communication devices 121-129 include wireless communication devices such as a telephone, cellular phone, mobile phone, smartphone, Personal Digital Assistant (PDA), laptop, computer, e-book, eReader, mobile Internet appliance, or some other wireless communication device with a wireless transceiver—including combinations thereof. Examples of wireless communication network 140 include a Long Term Evolution (LTE) network, Evolution Data Optimized (EVDO) network, Code Division Multiple Access (CDMA) network, Global System for Mobile communications (GSM) network, High Speed Packet Access (HSPA) network, Wireless Fidelity (WIFI) network, Worldwide Interoperability for Microwave Access (WiMAX), and the like. Examples wireless base stations 101-103 include a base station or eNodeB.

In operation, wireless base stations 101-103 generate performance data per device type per wireless communication sector that characterizes the performance of the wireless device types in wireless communication sectors 131-133. Examples of performance data include Hybrid Automatic Repeat Request (HARQ) metrics, idle-mode transitions, LTE registrations, and/or other performance data—including combinations thereof. Wireless device type may include device manufacturer identity, device model number, operating system type, operating system version, and/or other device types—including combinations thereof.

Data processing system 141 processes the performance data per device type per wireless communication sector to associate an abnormal condition with one of the wireless device types in one of wireless communication sectors 131-133. Examples of abnormal conditions include registration fails, dropped/blocked calls, data latency, no video service, and/or other abnormal conditions—including combinations thereof. Although not required, in some examples, the performance data may include historical or past performance data per device type per wireless communication sector.

Data processing system 141 generates notice data for the one or more wireless device types associated with an abnormal condition. An example of notice data includes a Uniform Resource Identifier (URI). Wireless base stations 101-103 broadcast the notice data in a Long Term Evolution (LTE) System Information Block (SIB). The notice data identifies the wireless device type. Wireless communication devices 121-129 decode the LTE SIB to identify the notice data and the wireless device type. If the wireless communication device comprises the wireless device type identified in the notice data, the wireless communication device configures the wireless communication device based on the notice data.

Figure 2:
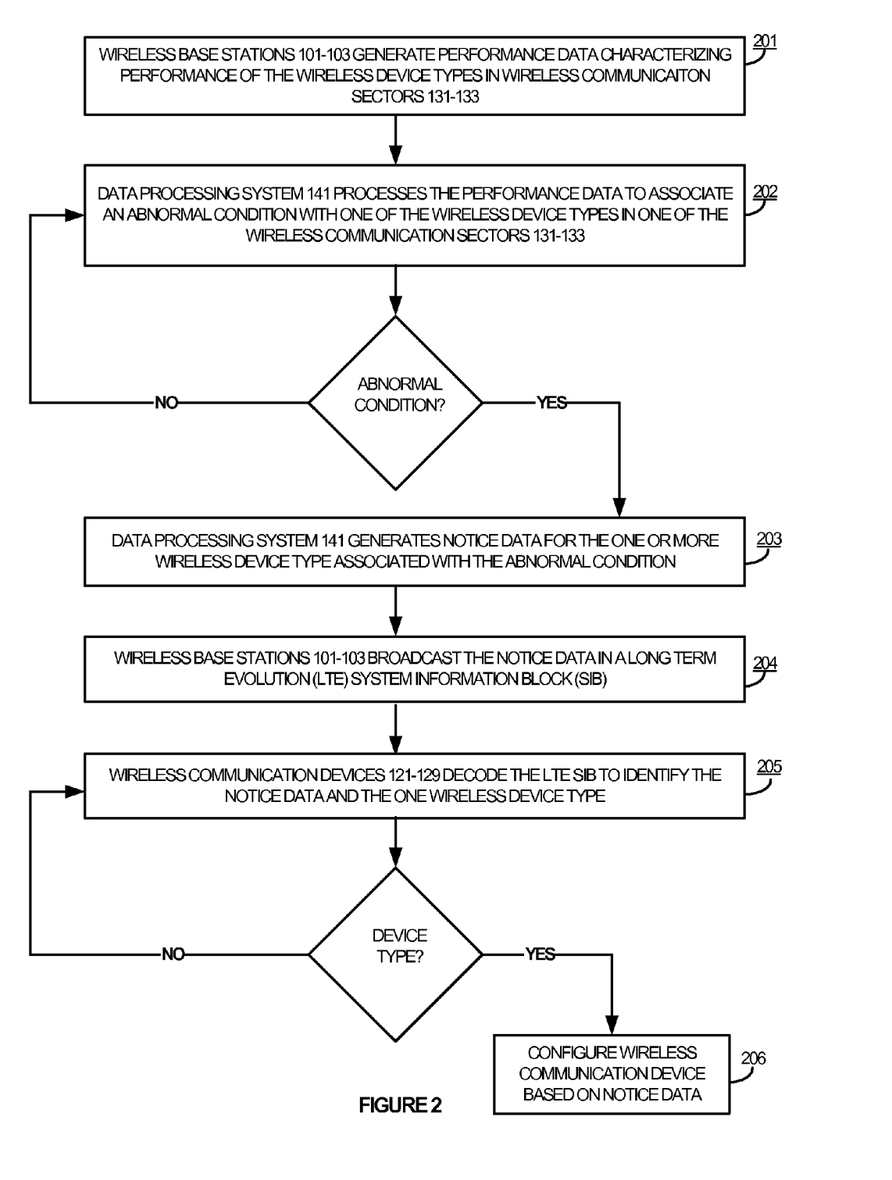
FIG. 2 illustrates the operation of the wireless communication system to detect an abnormal condition associated with wireless communication device types.

FIG. 2 illustrates the operation of wireless communication system 100 to detect an abnormal condition associated with wireless communication device types. Wireless base stations 101-103 generate performance data characterizing the performance of the wireless device types in wireless communication sectors 131-133 (201). Data processing system 141 processes the performance data to associate an abnormal condition with one of the wireless device types in one of wireless communication sectors 131-133 (202). Data processing system 141 generates notice data for the one or more wireless device types associated with an abnormal condition (203). Wireless base stations 101-103 broadcast the notice data in a Long Term Evolution (LTE) System Information Block (SIB) (204). The notice data identifies the wireless device type.

Wireless communication devices 121-129 decode the LTE SIB to identify the notice data and the wireless device type (205). If the wireless communication device comprises the wireless device type identified in the notice data, the wireless communication device configures the wireless communication device based on the notice data (206). In some examples, the wireless communication device may disable a frequency band used by the wireless communication device in the wireless communication sector. In other examples, the wireless communication device may disable a wireless communication network used by the wireless communication device in the wireless communication sector. In yet other examples, the wireless communication device may disable a wireless voice or data service used by the wireless communication device in the wireless communication sector.

Figure 3:
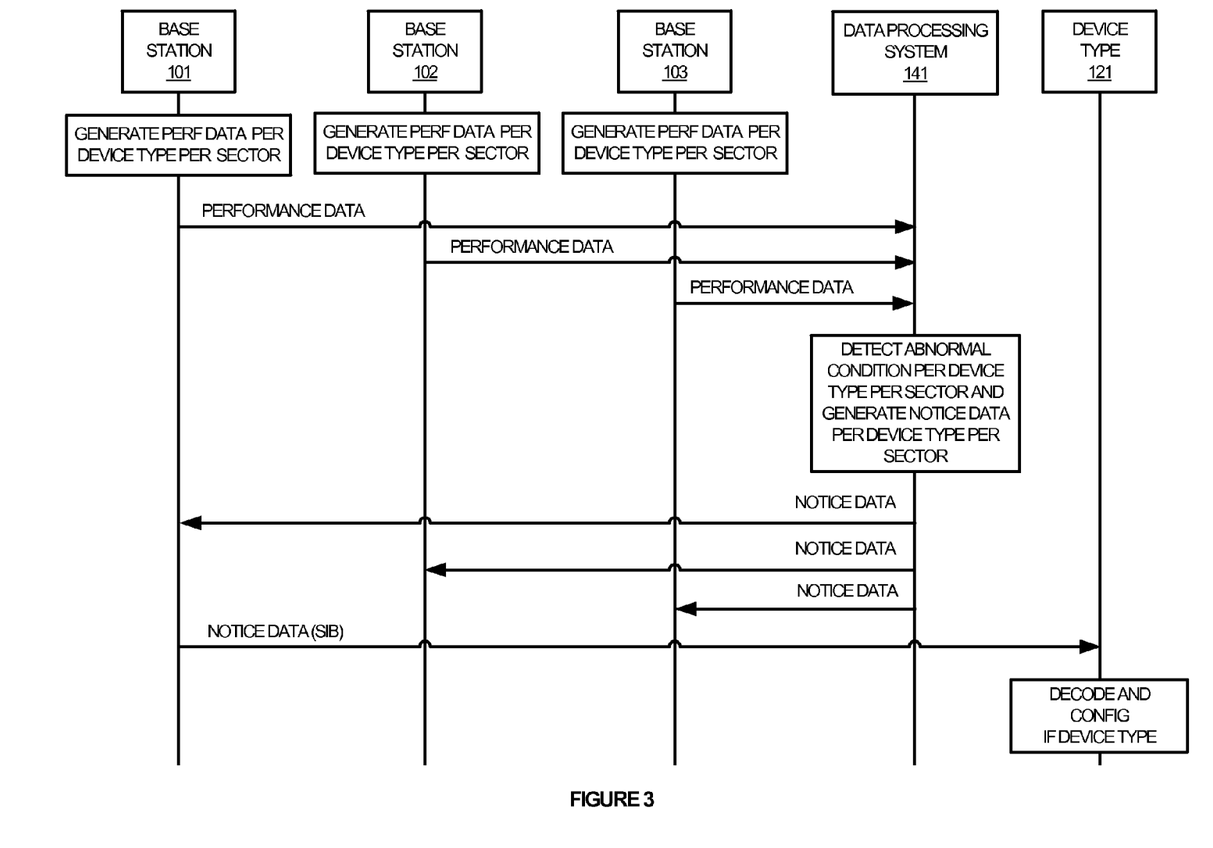
FIG. 3 illustrates the operation of the wireless communication system to detect an abnormal condition associated with wireless communication device types.

FIG. 3 illustrates the operation of wireless communication system 100 to detect an abnormal condition associated with wireless communication device types. Wireless base stations 101-103 generate performance data that characterizes the performance of the wireless device types in wireless communication sectors 131-133. Wireless base stations 101-103 transfer the performance data to data processing system 141. Data processing system 141 processes the performance data to associate an abnormal condition with one or more of the wireless device types.

Data processing system 141 generates notice data for the one or more wireless device types associated with an abnormal condition. Data processing system 141 transfers the notice data to wireless base stations 101-103. Wireless base station 101 broadcasts the notice data in a Long Term Evolution (LTE) System Information Block (SIB) to wireless communication device 121. The notice data identifies the wireless device type. Wireless communication device 121 decodes the LTE SIB to identify the notice data and the associated wireless device type. If wireless communication device 121 is of the associated wireless device type, then wireless communication device 121 configures itself based on the notice data.

Figure 4:
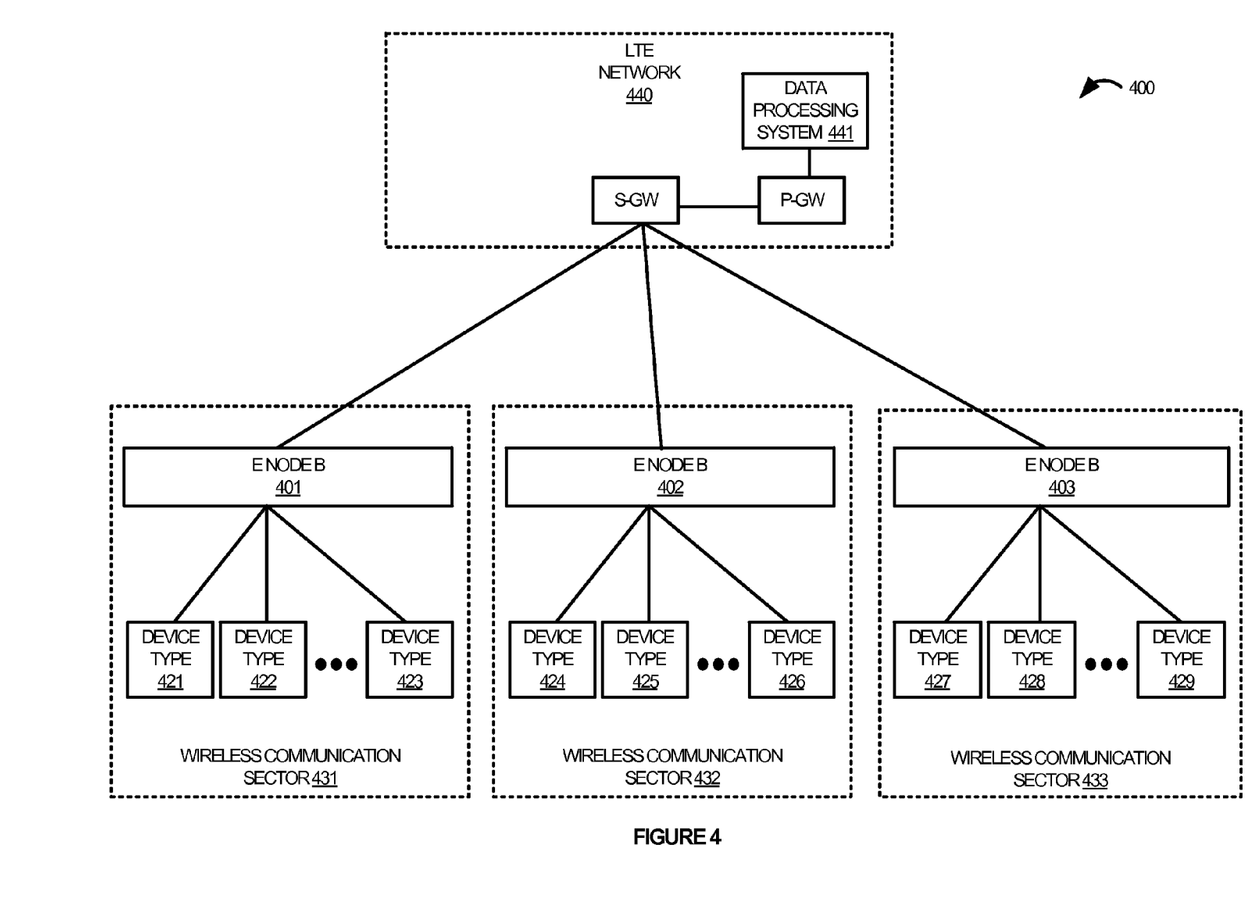
FIG. 4 illustrates an LTE communication system to detect an abnormal condition associated with wireless communication device types.

FIG. 4 illustrates LTE communication system 400 to detect an abnormal condition associated with wireless communication device types. LTE communication system 400 is an example of wireless communication system 100, although wireless communication system 100 may use alternative configurations and operations. LTE communication system 400 includes eNodeBs 401-403, wireless communication devices (with device types) 421-429, wireless communication sectors 431-433, and LTE network that includes Serving Gateway (S-GW), PDN Gateway (P-GW), and data processing system 441.

ENodeB 401 serves wireless communication devices 421-423 in wireless communication sector 431. ENodeB 402 serves wireless communication devices 424-426 in wireless communication sector 432. ENodeB 403 serves wireless communication devices 427-429 in wireless communication sector 433. Although, not shown as overlapping, in some examples wireless communication sectors 431-433 may overlap in some areas.

ENodeBs 401-403 generate performance data that characterizes the performance of the wireless device types in wireless communication sectors 431-433. ENodeBs 401-403 transfer the performance data to data processing system 441 through the S-GW and the P-GW. Data processing system 441 processes the performance data to associate an abnormal condition with one of the wireless device types.

Data processing system 441 generates notice data for the one or more wireless device types associated with an abnormal condition. Data processing system 441 transfers the notice data to ENodeBs 401-403. ENodeB 401 broadcasts the notice data in an LTE SIB to wireless communication device 421. The notice data identifies the wireless device type. Wireless communication device 421 decodes the LTE SIB to identify the notice data and the associated wireless device type. If wireless communication device 421 is of the associated wireless device type, then wireless communication device 421 configures itself based on the notice data.

Figure 5:
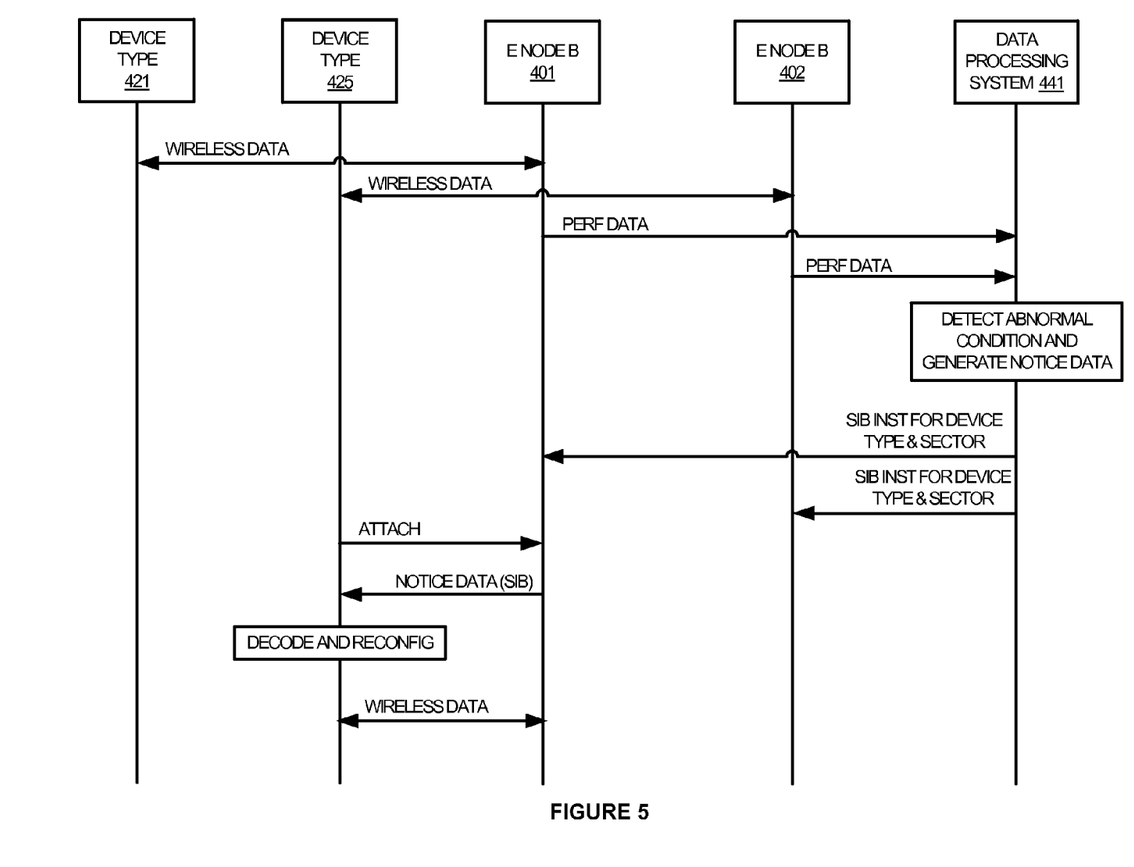
FIG. 5 illustrates the operation of the LTE communication system to detect an abnormal condition associated with wireless communication device types.

FIG. 5 illustrates the operation of LTE communication system 400 to detect an abnormal condition associated with wireless communication wireless device types. Wireless communication device 421 is receiving wireless communication service through eNodeB 401. Wireless communication device 425 is receiving wireless communication service through eNodeB 402. ENodeB 401 and eNodeB 402 generate performance data per wireless device type per wireless communication sector. ENodeB 401 and eNodeB 402 transfer the performance data per device type and per wireless communication sector to data processing system 441.

Data processing system 441 processes the performance data per device type and per wireless communication sector to associate an abnormal condition with one or more of the wireless device types. Data processing system 441 generates notice data for the one or more wireless device types associated with an abnormal condition. Data processing system 441 transfers the notice data per wireless device type per wireless sector to eNodeB 401 and eNodeB 402. Wireless communication device 425 moves from wireless communication sector 432 into wireless communication sector 431 that is serviced by eNodeB 401.

ENodeB 401 broadcasts a Primary Synchronization Signal (PSS), Secondary Synchronization Signal (SSS), Master Information Block (MIB), and System Information Block (SIB). Wireless communication device 425 can receive network data and register by decoding the PSS, SSS, MIB, and SIB. During cell synchronization wireless communication device 425 decodes and processes the SIB that includes notice data per wireless device type and per wireless communication sector. If the wireless device type in the notice data matches the wireless device type for wireless communication device 425, wireless communication device 425 reconfigures according to the instructions in the notice data.

For example, the notice data may instruct wireless communication device 425 to disable a frequency band while located in wireless communication sector 431. In other examples, the notice data may instruct wireless communication device 425 to disable a wireless communication network. For instance, LTE service may slower than 3G service for the wireless device type in wireless communication sector 431. In other examples, the notice data may instruct wireless communication device 425 to disable wireless voice service in wireless communication sector 431. In yet other examples, the notice data may instruct wireless communication device 425 to update software versions. This may include providing a Uniform Resource Identifier (URI) to download the most recent version of the software. After wireless communication device 425 reconfigures based on the instructions in the notice data, wireless communication device exchanges wireless data with eNodeB 401.

Figure 6:
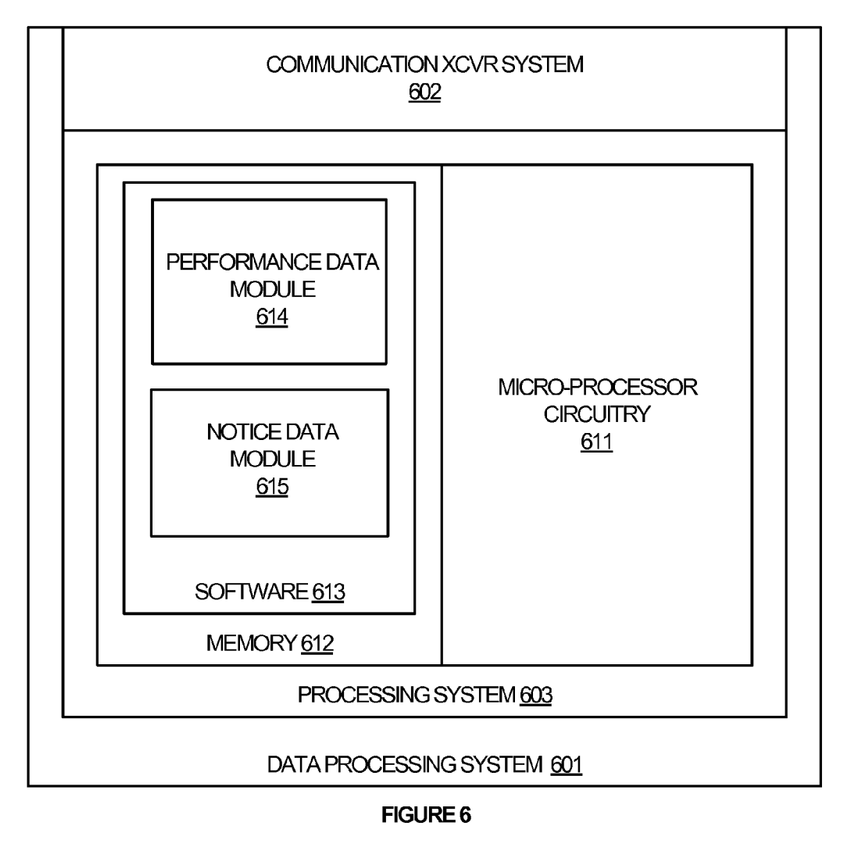
FIG. 6 illustrates a data processing system to detect an abnormal condition associated with wireless communication device types.

FIG. 6 illustrates data processing system 601 to detect an abnormal condition associated with wireless communication device types. Data processing system 601 is an example of data processing systems 141 and 441, although data processing systems 141 and 441 could use alternative configurations. Data processing system 601 comprises communication transceiver system 602 and processing system 603. Processing system 603 is linked to communication transceiver system 602. Processing system 603 includes processing circuitry 611 and memory 612 that stores operating software 613. Software 613 comprises performance data module 614 and notice data module 615.

Communication transceiver system 602 may comprise ports and digital signal processing circuitry Communication transceiver system 602 may also include a memory device, software, processing circuitry, or some other communication device. Communication transceiver system 602 may use various communication formats, such as Time Division Multiplex (TDM), Internet Protocol (IP), Ethernet, communication signaling or some other communication format—including combinations thereof.

Micro-Processor circuitry 611 comprises microprocessor and other circuitry that retrieves and executes operating software 613 from memory 612. Memory 612 comprises a non-transitory storage medium, such as a disk drive, flash drive, data storage circuitry, or some other memory apparatus. Micro-Processor circuitry 611 is typically mounted on a circuit board that may also hold memory 612 and portions of communication transceiver system 602. Software 613 comprises computer programs, firmware, or some other form of machine-readable processing instructions. Software 613 may include an operating system, utilities, drivers, network interfaces, applications, or some other type of software.

When executed, software 613 directs processing system 603 to operate as described herein to process performance data to associate an abnormal condition with wireless device types and to generate notice data. In particular, performance data module 614 directs processing system 603 to process the performance data per device type per wireless communication sector to identify an abnormal condition associated with a wireless device type. Notice data module 615 directs processing system 603 to generate the notice data for the one or more wireless device types responsive to the identified abnormal condition.

Figure 7:
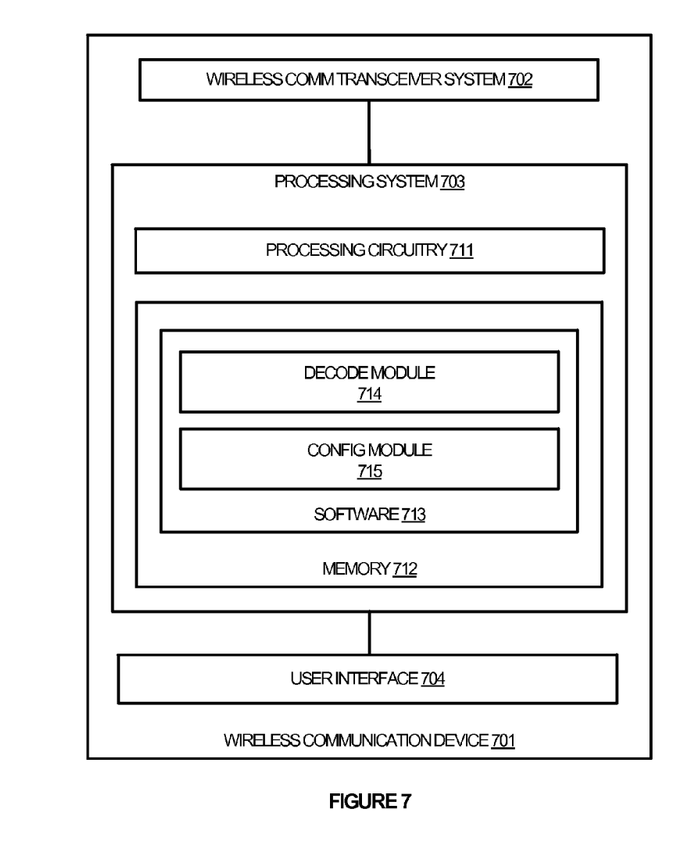
FIG. 7 illustrates a wireless communication device to detect an abnormal condition associated with wireless communication device types.

FIG. 7 illustrates wireless communication device 701. Wireless communication device 701 is an example of wireless communication devices 121-129 and 421-429, although wireless communication devices 121-129 and 421-429 could use alternative configurations. Wireless communication device 701 comprises wireless communication transceiver system 702, processing system 703, and user interface 704. Processing system 703 is linked to wireless communication transceiver system 702 and user interface 704. Processing system 703 includes processing circuitry 711 and memory 712 that stores operating software 713. Software 713 comprises decode module 714 and configuration (config) module 715.

Wireless communication device 701 may include other well-known components such as a battery and enclosure that are not shown for clarity. Wireless communication device 701 may be a telephone, cellular phone, mobile phone, smartphone, personal digital assistant (PDA), computer, laptop, tablet, e-book, mobile Internet appliance, media player, game console, wireless network interface card, or some other wireless communication apparatus—including combinations thereof.

Wireless communication transceiver system 702 comprises RF communication circuitry and an antenna. The RF communication circuitry typically includes an amplifier, filter, RF modulator, and signal processing circuitry. Wireless communication transceiver system 702 may also include a memory device, software, processing circuitry, or some other communication device. Wireless communication transceiver system 702 may use various communication formats, such as CDMA, EVDO, WIMAX, GSM, LTE, WIFI, HSPA, or some other wireless communication format—including combinations thereof.

User interface 704 comprises components that interact with a user to receive user inputs and to present media and/or information. User interface 704 may include a speaker, microphone, buttons, lights, display screen, touch screen, touch pad, scroll wheel, keyboard, communication port, or some other user input/output apparatus—including combinations thereof. User interface 704 may be omitted in some examples.

Processing circuitry 711 comprises microprocessor and other circuitry that retrieves and executes operating software 713 from memory 712. Memory 712 comprises a non-transitory storage medium, such as a disk drive, flash drive, data storage circuitry, or some other memory apparatus. Processing circuitry 711 is typically mounted on a circuit board that may also hold memory 712, portions of wireless communication transceiver system 702, and user interface 704. Software 713 comprises computer programs, firmware, or some other form of machine-readable processing instructions. Software 713 may include an operating system, utilities, drivers, network interfaces, applications, or some other type of software. When executed by processing circuitry 711, software 713 directs processing system 703 to operate wireless communication device 701 as described herein.

When executed, software 713 directs processing system 703 to operate as described herein to receive and decode notice data and configure wireless communication device 701 based on the instructions in the notice data. In particular, decode module 714 directs processing system 703 to decode the LTE SIB to identify the notice data and the associated wireless device type. Configuration module 715 directs processing system 703 to configure wireless communication device 701 based on the notice data. Although not required, the reconfiguration of wireless communication device 701 may include asking the user for approval or selection prior to configuring wireless communication device 701.

Referring back to FIG. 1, wireless base stations 101-103 comprise RF communication circuitry and an antenna. The RF communication circuitry typically includes an amplifier, filter, RF modulator, and signal processing circuitry. Wireless base stations 101-103 may also comprise a router, server, memory device, software, processing circuitry, cabling, power supply, network communication interface, structural support, or some other communication apparatus. Wireless base stations 101-103 could be a base station, eNodeB, Internet access node, telephony service node, wireless data access point, or some other wireless communication system—including combinations thereof.

Wireless communication devices 121-129 comprise Radio Frequency (RF) communication circuitry and an antenna. The RF communication circuitry typically includes an amplifier, filter, modulator, and signal processing circuitry. Wireless communication devices 121-129 may also include a user interface, memory device, software, processing circuitry, or some other communication components. Wireless communication devices 121-129 may be a telephone, computer, e-book, mobile Internet appliance, wireless network interface card, media player, game console, or some other wireless communication apparatus—including combinations thereof.

Data processing system 141 comprises a computer system and communication interface. Data processing system 141 may also include other components such as a router, server, data storage system, and power supply. Data processing system 141 may reside in a single device or may be distributed across multiple devices. Data processing system 141 is shown within wireless communication network 140; however data processing system 141 could be separate from wireless communication network 140 or integrated within the components of wireless base stations 101-103.

Wireless communication network 140 comprises network elements that provide communications services to wireless communication devices 121-129 through wireless base stations 101-103. Wireless communication network 140 may comprise switches, wireless access nodes, Internet routers, network gateways, application servers, computer systems, communication links, or some other type of communication equipment—including combinations thereof.

Wireless link 114 uses the air or space as the transport media. Wireless link 114 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 111-113 use metal, glass, air, space, or some other material as the transport media. Communication links 111-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-113 could be a direct link or may include intermediate networks, systems, or devices.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system having a plurality of wireless base stations serving a plurality of wireless communication devices located in a plurality of wireless communication sectors, wherein the wireless communication devices have a plurality of wireless device types, the method comprising:

in the wireless base stations, generating performance data characterizing performance of the wireless device types in the wireless communication sectors;

in a data processing system, processing the performance data to associate an abnormal condition with one of the wireless device types in one of the wireless communication sectors and generating notice data for the one wireless device type responsive to the abnormal condition;

in one of the base stations serving the one wireless communication sector, broadcasting the notice data in a Long Term Evolution (LTE) System Information Block (SIB) within the one wireless communication sector, wherein the notice data indicates the one wireless device type; and in one of the wireless communication devices located in one of the wireless communication sectors, decoding the LTE SIB to identify the notice data and the one wireless device type, and if the one wireless communication device comprises the one wireless device type, then configuring the one wireless communication device based on the notice data.

2. The method of claim 1 wherein configuring the one wireless communication device based on the notice data comprises disabling a frequency band used by the one wireless communication device in the one wireless communication sector.

3. The method of claim 1 wherein configuring the one wireless communication device based on the notice data comprises disabling a wireless communication network used by the one wireless communication device in the one wireless communication sector.

4. The method of claim 1 wherein configuring the one wireless communication device based on the notice data comprises disabling a wireless voice service in the one wireless communication sector.

5. The method of claim 1 wherein the device type comprises device manufacturer identity and model number.

6. The method of claim 1 wherein the device type comprises operating system type and version number.

7. The method of claim 1 wherein the performance data comprises HARQ metrics per bandwidth per wireless device type.

8. The method of claim 1 wherein the performance data comprises idle-mode transitions per bandwidth per wireless device type.

9. The method of claim 1 wherein the performance data comprises LTE registrations per bandwidth per wireless device type.

10. The method of claim 1 wherein the notice data comprises a Uniform Resource Identifier (URI).

11. A wireless communication system having a plurality of wireless base stations serving a plurality of wireless communication devices located in a plurality of wireless communication sectors, wherein the wireless communication devices have a plurality of wireless device types, the wireless communication system comprising:
- one of the wireless base stations, configured to generate performance data characterizing performance of the wireless device types in the wireless communication sectors;
- a data processing system, configured to process the performance data to associate an abnormal condition with one of the wireless device types in one of the wireless communication sectors and to generate notice data for the one wireless device type responsive to the abnormal condition;
- one of the base stations serving the one wireless communication sector, configured to broadcast the notice data in a Long Term Evolution (LTE) System Information Block (SIB) within the one wireless communication sector, wherein the notice data indicates the one wireless device type; and
- one of the wireless communication devices located in one of the wireless communication sectors, configured to decode the LTE SIB to identify the notice data and the one wireless device type, and if the one wireless communication device comprises the one wireless device type, then configuring the one wireless communication device based on the notice data.

12. The wireless communication system of claim 11 wherein the one wireless communication device is configured to disable a frequency band used by the one wireless communication device in the one wireless communication sector.

13. The wireless communication system of claim 11 wherein the one wireless communication device is configured to disable a wireless communication network used by the one wireless communication device in the one wireless communication sector.

14. The wireless communication system of claim 11 wherein the one wireless communication device is configured to disable a wireless voice service in the one wireless communication sector.

15. The wireless communication system of claim 11 wherein the device type comprises device manufacturer identity and model number.

16. The wireless communication system of claim 11 wherein the device type comprises operating system type and version number.

17. The wireless communication system of claim 11 wherein the performance data comprises HARQ metrics per bandwidth per wireless device type.

18. The wireless communication system of claim 11 wherein the performance data comprises idle-mode transitions per bandwidth per wireless device type.

19. The wireless communication system of claim 11 wherein the performance data comprises LTE registrations per bandwidth per wireless device type.

20. The wireless communication system of claim 11 wherein the notice data comprises a Uniform Resource Identifier (URI).

* * * * *